(12) United States Patent
Baumgartner

(10) Patent No.: US 8,136,833 B2
(45) Date of Patent: Mar. 20, 2012

(54) AIRBAG ARRANGEMENT FOR A VEHICLE OCCUPANT RESTRAINT SYSTEM

(75) Inventor: Peter Baumgartner, Günzburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/966,990

(22) Filed: Dec. 13, 2010

(65) Prior Publication Data

US 2011/0079989 A1 Apr. 7, 2011

Related U.S. Application Data

(63) Continuation of application No. PCT/EP2009/058591, filed on Jul. 7, 2009.

(30) Foreign Application Priority Data

Jul. 9, 2008 (DE) .................. 10 2008 032 964

(51) Int. Cl.
*B60R 21/213* (2006.01)
(52) U.S. Cl. .................. 280/728.2; 411/508; 24/458
(58) Field of Classification Search .............. 280/728.2, 280/730.2; 411/45–48, 508–510, 174, 175; 24/291–293, 458, 453
See application file for complete search history.

(56) References Cited

U.S. PATENT DOCUMENTS

| | | | | |
|---|---|---|---|---|
| 4,422,222 A * | 12/1983 | Notoya | ............................ | 24/614 |
| 6,705,635 B2 * | 3/2004 | Hoeft et al. | ................. | 280/728.2 |
| 6,923,407 B2 * | 8/2005 | Takeuchi | ........................ | 248/73 |
| 7,073,231 B2 * | 7/2006 | Draggoo et al. | ................. | 24/297 |
| 7,267,361 B2 * | 9/2007 | Hofmann et al. | .......... | 280/728.2 |
| 7,374,200 B2 | 5/2008 | Ikeda et al. | | |
| 7,637,527 B2 * | 12/2009 | Mazanek et al. | ........... | 280/728.2 |
| 7,887,086 B2 * | 2/2011 | Kalandek | .................... | 280/728.2 |
| 2006/0066080 A1 | 3/2006 | Ikeda et al. | | |
| 2006/0138756 A1 | 6/2006 | Ochiai et al. | | |
| 2006/0197317 A1 | 9/2006 | Watanabe | | |
| 2007/0158931 A1 | 7/2007 | Baumgartner et al. | | |
| 2009/0020986 A1 * | 1/2009 | Baumgartner et al. | .... | 280/728.2 |
| 2009/0127834 A1 * | 5/2009 | Hemingway | ............... | 280/728.2 |
| 2010/0043185 A1 | 2/2010 | Baumgartner et al. | | |
| 2011/0062684 A1 * | 3/2011 | Baumgartner et al. | .... | 280/728.2 |

FOREIGN PATENT DOCUMENTS

| | | |
|---|---|---|
| DE | 20 2004 014 219 U1 | 12/2004 |
| DE | 20 2006 000 846 U1 | 3/2006 |
| DE | 20 2007 004 549 U1 | 6/2007 |
| WO | WO-2008/028646 A1 | 3/2008 |

* cited by examiner

*Primary Examiner* — Drew Brown

(74) *Attorney, Agent, or Firm* — Foley & Lardner LLP

(57) ABSTRACT

An airbag arrangement for a vehicle occupant restraint system is provided. The airbag arrangement comprising an inflatable airbag for protecting a vehicle occupant, a fastening element for fastening the airbag to a support structure, and means for counteracting a torquing of the fastening element pre-mounted at the airbag, wherein the means comprise an opening through which the pre-mounted fastening element reaches, said opening being designed to counteract a torquing of the pre-mounted fastening element. The opening comprises two sections that cross one another.

16 Claims, 8 Drawing Sheets

AIRBAG ARRANGEMENT FOR A VEHICLE OCCUPANT RESTRAINT SYSTEM

CROSS-REFERENCE TO A RELATED APPLICATION

This application is a continuation of International Application PCT/EP2009/058591, filed on Jul. 7, 2009, which claims priority of German Patent Application Number 10 2008 032 964.9, filed on Jul. 9, 2008, including the specification, drawings, claims and abstract, is incorporated herein by reference in its entirety.

BACKGROUND

The invention relates to an airbag arrangement for a vehicle occupant restraint system.

An airbag arrangement, which is mounted to a body structure of a vehicle by the means of a fastening clip, is for instance known from DE 20 2006 000 846 U1.

SUMMARY

The object to be solved by the invention is to provide an airbag arrangement which can be assembled in a simple manner.

According to an exemplary embodiment of the invention an airbag arrangement for a vehicle occupant restraint system is being provided comprising:

- an inflatable airbag for protecting a vehicle occupant,
- a fastening element for fastening the airbag to a support structure, and
- means for counteracting a torquing of the fastening element pre-mounted at the airbag, whereby
- the means comprise an opening through which the pre-mounted fastening element reaches and is being designed for counteracting a torquing of the pre-mounted fastening element.

The opening comprises furthermore two sections that cross one another.

The support structure can be in particular a part of a vehicle body or a part connected to the vehicle body, which comprises a fastening opening in which the fastening element can be locked. By the means of the fastening elements locked to a support structure the airbag is arranged on the support structure.

The opening with the sections crossing each other provides that the fastening element during its pre-mounting with the airbag can already be brought into the correct mounting position and remains in said position. A new aligning (rotating) of the fastening element immediately before the mounting of the airbag at the vehicle body is omitted.

In an example the sections of the opening crossing each other are formed longitudinal (for instance slid-like) and continue for instance approximately vertical to each other. In particular, the sections cross each other with their respective middle sections so that a symmetrical cross-like opening is formed, for instance in form of a "Swiss Cross". A symmetrical design of the opening is however not necessarily required.

A fastening element can be used which comprises two arms opposing each other via which the fastening element can be locked to the support structure. Such a fastening element is for instance described in the German utility model DE 20 2004 014 219 which is in so far referenced herewith. One of the sections of the opening crossing each other is in particular formed such that the arms of the fastening element can reach trough said section without being compressed together.

In another example the opening through which the fastening element is supposed to reach in its mounting position is formed in a fastening strap via which the airbag can be mounted at the support structure. The fastening strap sticks out from the airbag and can be connected with it by connecting means (for instance a stitching). It is however also possible that the fastening strap is integrally formed with the airbag.

The fastening strap can in particular comprise multiple material layers (for instance from an airbag material), whereby the opening for the fastening means which serves as torquing protection, is formed for instance only in one of the material layers or also in multiple of the material layers. However, in each of the material layers an opening has to be present, which does not serve necessarily as torquing protection, through which however the fastening element can be guided.

In a further exemplary variant of the invention the opening for torquing protection is formed in a part different from the fastening strap, whereby the part is connected to the fastening strap. This part can be for instance arranged on a side of the fastening strap, which faces away from the support structure in the mounted status of the airbag. It is however not necessarily required that the opening for the torquing protection is arranged in a part separate from the fastening strap. In another variant of the invention the fastening strap itself comprises the opening with the sections crossing each other.

Furthermore, the fastening strap can comprise a first section and a second section, whereby the second section is folded in direction of the first section that means the first section is connected to the second section via a bend. The ends of the sections distanced from the bend are in particular arranged at the airbag. The opening with the sections crossing each other is formed in this variant for instance in one of the two sections of the fastening strap.

In a further exemplary improvement of this variant the second section of the fastening element comprises an opening, which counteracts a torquing of the pre-mounted fastening element (that means the opening with the sections crossing each other), while the first section comprises an opening, which aligns with the opening in the second sections, is however not designed and provided for counteracting a torquing of the pre-mounted fastening element.

Therefore, only one of the openings in the fastening strap serves as a torquing protection, that means is formed such that the fastening element through which said strap reaches after pre-mounting at the airbag cannot or only slightly be torqued. The opening formed in the first section however has another design than the opening in the second section so that said opening does not counteract a torquing of the fastening element. The opening in the first section of the fastening strap is for instance formed circular. Since only one of the opening serves as a torquing protection the guiding of the fastening element through the fastening strap during the pre-mounting is simplified.

The second section in which the opening for the torquing protection is formed is in particular the section of the fastening strap which faces away from the support structure in the mounted status of the airbag.

Furthermore, the fastening element in the mounted status can rest against one side of the fastening strap with a sub-section, which faces away from the support structure. The second section of the fastening strap is thereby designed such that the sub-section of the fastening element rests only against the first section of the fastening strap. More precise, the sub-section of the fastening element rests against a side of the first section, which faces away from the support structure in the mounted status of the airbag.

The sub-section which rests against the fastening strap is formed in particular by two contact surfaces of the fastening element distanced from each other. The width in the area of the opening of the second section of the fastening strap is in particular selected such that it is smaller that the distance of the two contact surfaces in the mounted status of the fastening element. Therefore, the contact surfaces of the fastening element rest only against the first section of the fastening strap.

In a further aspect the invention relates to an airbag arrangement, in particular as described further above in respect to the opening for torquing protection with sections crossing each other, comprising:
- an inflatable airbag for protecting a vehicle occupant,
- a fastening strap connected to the airbag via which the airbag can be fastened to a support structure, whereby
- a first opening formed in the fastening strap,
- a fastening element for fastening the airbag to the support structure which reaches through the first opening in the mounted status of the airbag, and
- means for counteracting a torquing of the fastening element pre-mounted to the airbag, whereby
- the means comprise a second opening (opening for a torquing protection) in a portion (torquing protection) different from the fastening strap, through which the pre-mounted fastening element reaches and is being formed for counteracting a torquing of the pre-mounted fastening element.

Furthermore, the part with the second opening can be clamped to the fastening strap, for which reason it is designed clamp-like.

Therewith the part which serves as a torquing protection for the pre-mounted fastening element is connected to the fastening strap in a detachable manner. The fastening strap connected to the airbag comprises for instance one or multiple layers, whereby the part with the opening for torquing protection can be connected to one of the layers or also with all layers via a clamp connection. This is done in particular such that the first and the second opening align with each other.

The clamp-like portion comprises in particular a first section and a second section, whereby the second section is bent in direction of the first section. The part is therefore formed in one piece which is being bent along a bending line so that it receives its clamp-like shape and comprises two sections opposing each other, which are connected with each other via a bend. A restoring force is created by bending apart these sections, which is used for clamping the part on the fastening strap.

The first as well as the second section of the part comprise an opening, which together form the second opening. However, it is sufficient if one of the two openings is formed as a torquing protection.

The part can be clamped onto the fastening strap such that the first section of the part rests against a side of the fastening strap, which is to face the support structure, while the second section of the part rests against a side of the fastening strap, which in the mounted status of the airbag faces away from the support structure. The opening for a torquing protection is for instance formed in the second section of the part, which in the mounted status of the airbag faces away from the support structure.

BRIEF DESCRIPTION OF THE DRAWINGS

The invention is explained in the following in more detail by the means of examples referring to the Figures.

DETAILED DESCRIPTION

Figure 1:
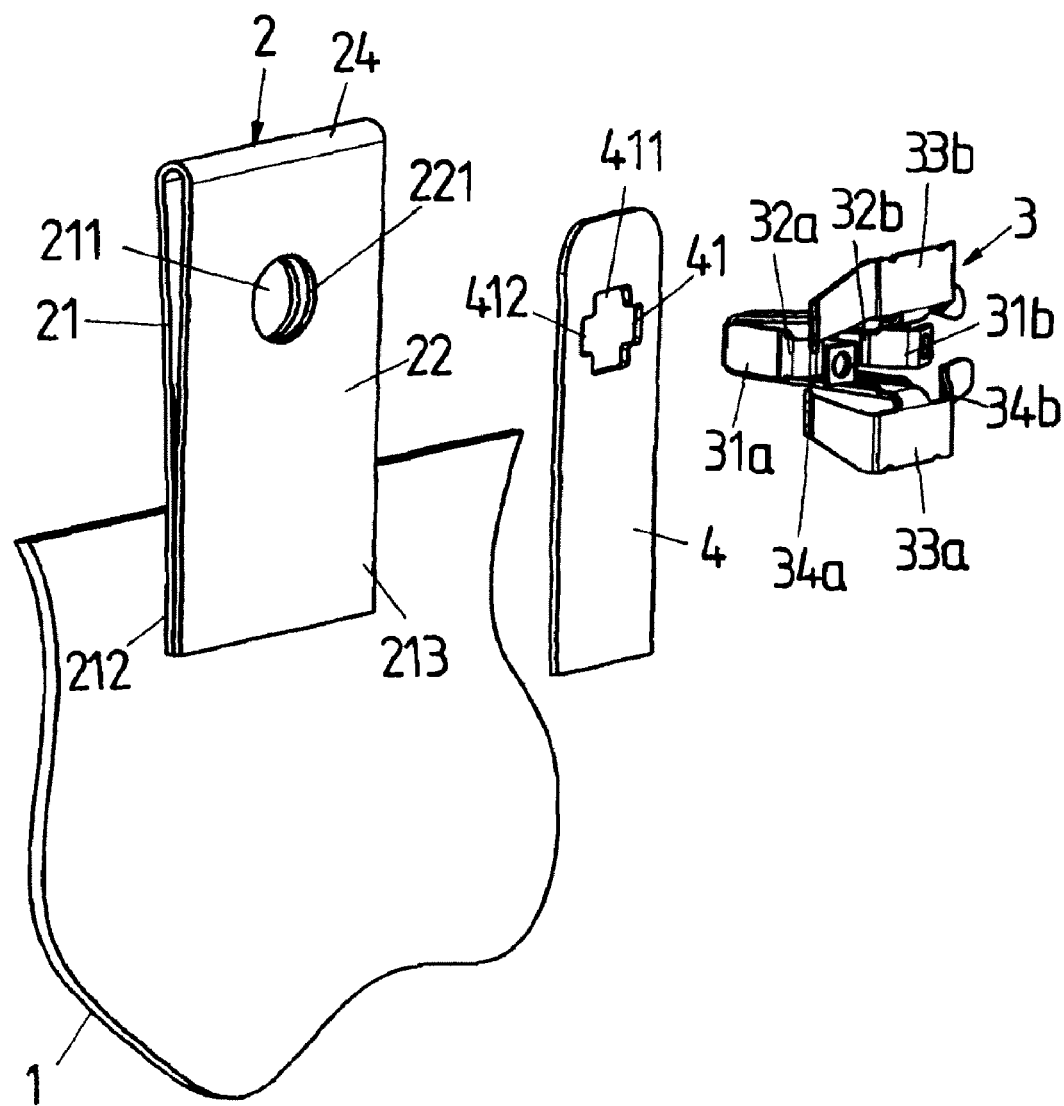
FIG. 1 shows a perspective illustration of components of an airbag arrangement according to a first embodiment of the invention.

FIG. 1 relates to a first embodiment of the invention according to which an airbag 1 comprises a first fastening strap 2 via which said airbag can be fastened to a holding structure (not shown), for instance a part of a vehicle body.

The fastening strap 2 comprises a first section 21 as well as a second section 22 which is folded (or bent) in direction of the first section 21, whereby ends 212, 213 of the respective sections 21, 22 are supposed to be connected to the airbag 1. The sections 21, 22 are connected with each other via a bend 24 of the fastening strap 2. Furthermore, the first and the second section 21, 22 comprise in each case a through opening 211, 221, which are aligned with each other.

The through openings 211, 221 serve the purpose to be able to guide a fastening element 3 through the fastening strap 2, which can lock to the holding structure and therefore can arrange the airbag 1 at the holding structure. The fastening element 3 is pre-mounted to the airbag before the actual mounting of the airbag 1 to the holding structure, that means it is guided through the opening 41 of the portion 4 and the openings 211, 221 of the fastening strap 2 and is aligned such that it can be locked in a fastening opening (not shown) of the holding structure.

The airbag arrangement comprises means for preventing a torquing of the pre-mounted fastening element 3, which comprise an opening 41 in a part 4.

The opening 41 of the part 4 is formed such that it counteracts a torquing of the such pre-mounted fastening element 3. For this reason, the opening 41 comprises two sections 411, 412 crossing each other, that means the opening is in form of a cross.

The fastening element 3 comprises two arms 31a, 31b opposing each other, which while inserting the fastening element into the fastening opening of the holding structure bend towards each other and lock to the holding structure by the means of a locking structure 32a, 32b, respectively.

One of the sections crossing each other (the "horizontal" section 412) is made such that it has an appropriate length and height, that the arms 31a, 31b of the fastening element 3 can reach through the section 412 and therefore through the opening 41 so that the section 412 blocks a torquing of the arms 31a, 31b and therefore the complete fastening element 3. The section 412 is in particular foamed such that the arms of the fastening element can be guided through said section without being pressed together or without being strongly pressed together so that the torquing protection can be optimal effective through the section 412.

The fastening element 3 comprises furthermore two further arms 33a, 33b also opposing each other on which the respective contact surfaces 34a, 34b are formed, which in the assembled status of the airbag rests against the fastening strap 2 and which press said strap after locking the fastening element 3 to the holding structure against the holding structure.

The section 411 of the opening 41 aligned vertically to the section 412 is formed such that the arms 33a, 33b of the fastening element 3 can be guided through, in particular such that they are while guiding through the opening 4 are not or only slightly pressed together.

Figure 2:
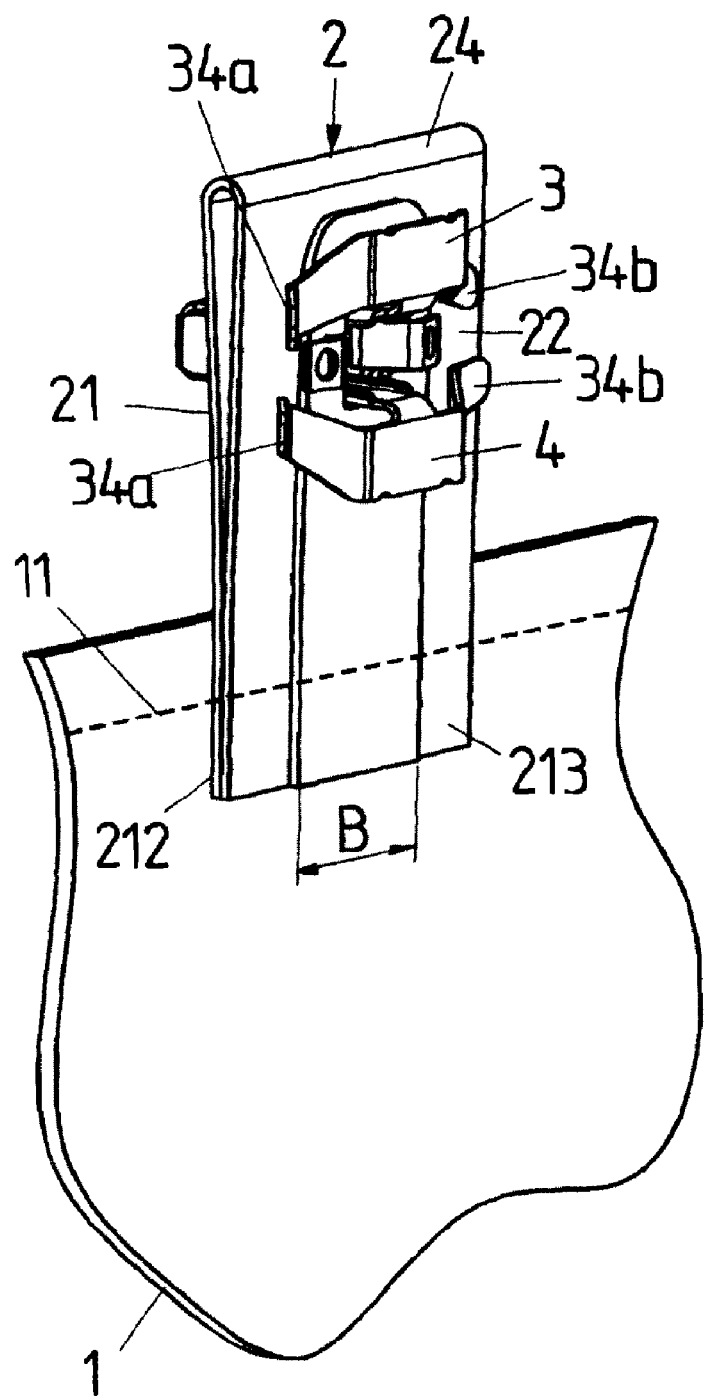
FIG. 2 shows the airbag arrangement of FIG. 1 in the assembled status.

FIG. 2 shows the arrangement from FIG. 1 in the assembled status. The ends 212, 213 of the two sections 21, 22 of the fastening strap 2 are connected to the airbag 1 via a stitch 11. Simultaneously, also the part 4 (the torque protection) is fastened via the stitch 11 to the fastening strap 2. The part 4 is formed in stripes and has a width B, which is smaller than the distance of the respective contact surfaces 34a, 34b of the arms 33a, 33b so that the contact surfaces 34a, 34b rest not on the part 4, but only on one side of the fastening strap 2, which in the assembled status of the airbag faces away from the holding structure.

Figure 3:
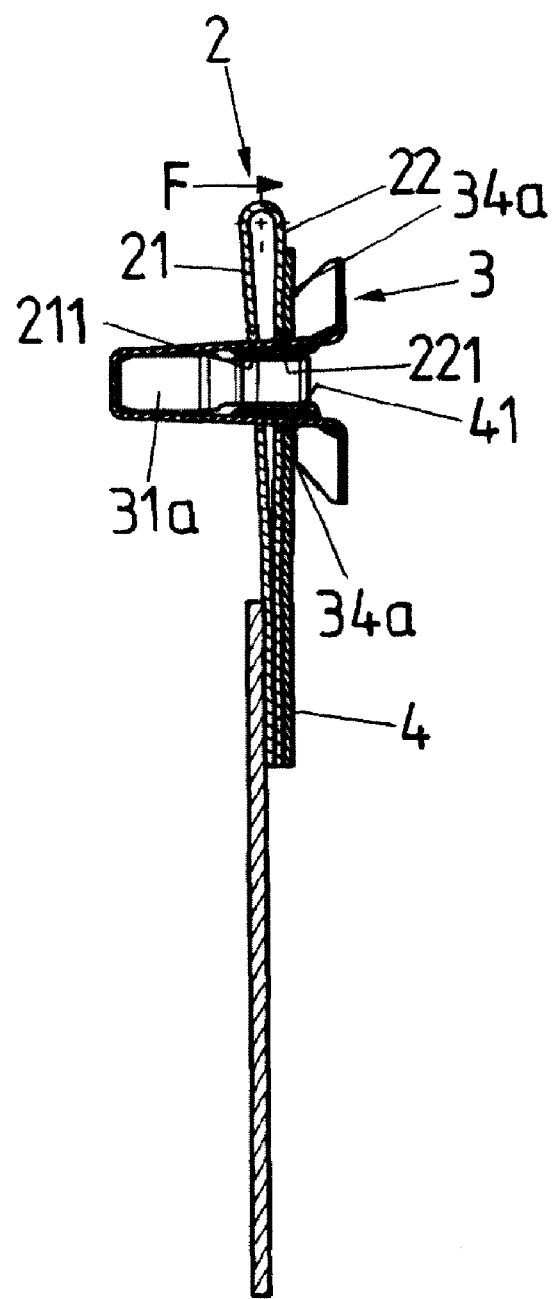
FIG. 3 shows a sectional view of the airbag arrangement from the FIGS. 1 and 2.

FIG. 3 shows a vertical cross section of the arrangement of FIG. 2. Due to the folded (or bent) design of the fastening strap 2 the fastening strap 2 creates while inserting the fastening element 3 into the openings 41, 211 and 221a restoring force F so that the part 4 is pressed against the fastening element 3. Through this, the opening 41 is positioned in an area of the fastening element 3 in which the arms 31a, 31b and 33a, 33b have approximately the largest possible distance to each other.

Figure 4:
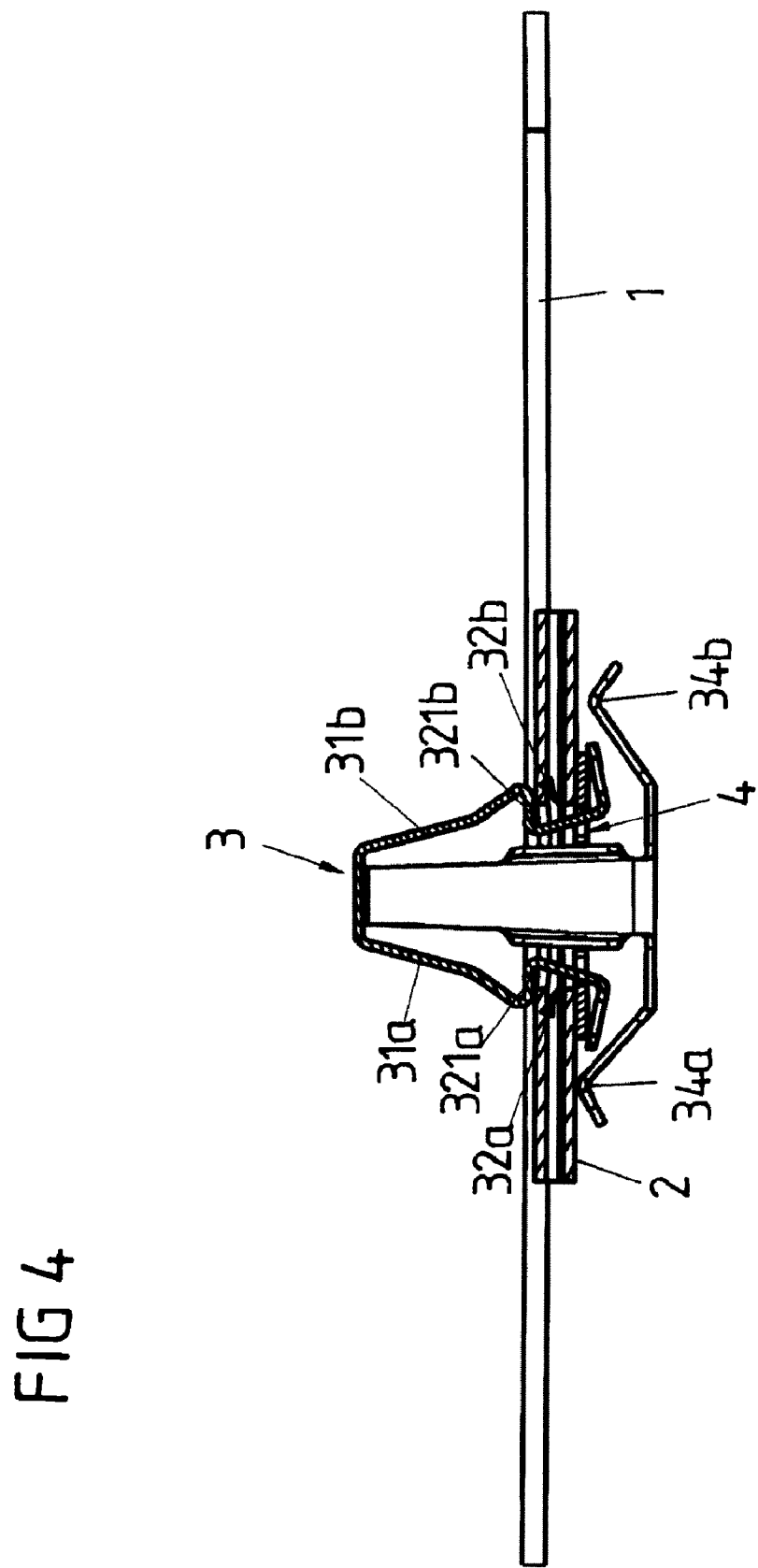
FIG. 4 shows a further sectional view of the airbag arrangement of the airbag arrangement from the FIGS. 1 to 3.

FIG. 4 shows the airbag arrangement from the FIGS. 1 to 3 in a cross section which is vertical to the cross section of FIG. 3. It is in particular recognizable that the locking structures 32a, 32b of the fastening element 3 reach in each case with a section 321a, 321b behind the holding structure (not shown) to which the airbag 1 is supposed to be fastened, and can therefore lock to the holding structure.

Figure 5:
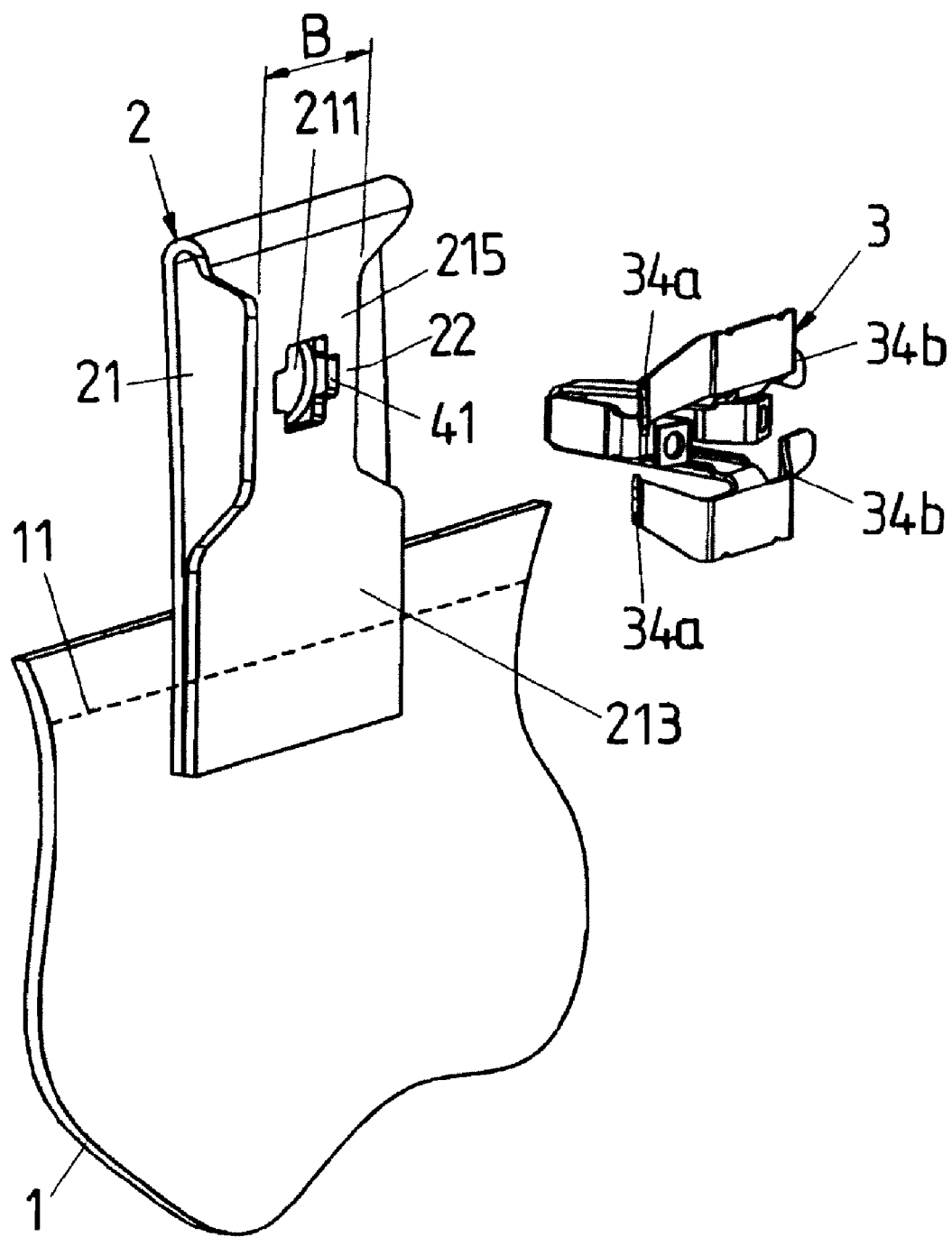
FIG. 5 shows an airbag arrangement according to a second embodiment of the invention.

FIG. 5 is a perspective illustration of an airbag arrangement according to a second embodiment of the invention. An airbag 1 has a fastening strap 2 connected to said airbag, which comprises as in the FIGS. 1 to 4 a first and a second section 21, 22, which are folded towards each other opposing each other.

However, different to the FIGS. 1 to 4 no specific part is present in which an opening for preventing a torquing of the pre-mounted fastening element is arranged. Instead, in the second section 22 of the fastening strap 2, which in the assembled status of the airbag faces away from the holding structure, a cross-like opening 41 is formed, which prevents a torquing of the pre-mounted fastening element 3 being guided through said opening. Herewith, the second section 22 of the fastening strap fulfils the function of the separate parts 4 of the FIGS. 1 to 4.

The first section 21 of the fastening strap 2 has an opening 211 aligned with the opening 41, which is formed circular and has therefore a different shape than the cross-like opening 41. It is however possible that the opening 211 in the first section 21 is also formed cross-like.

Figure 6:
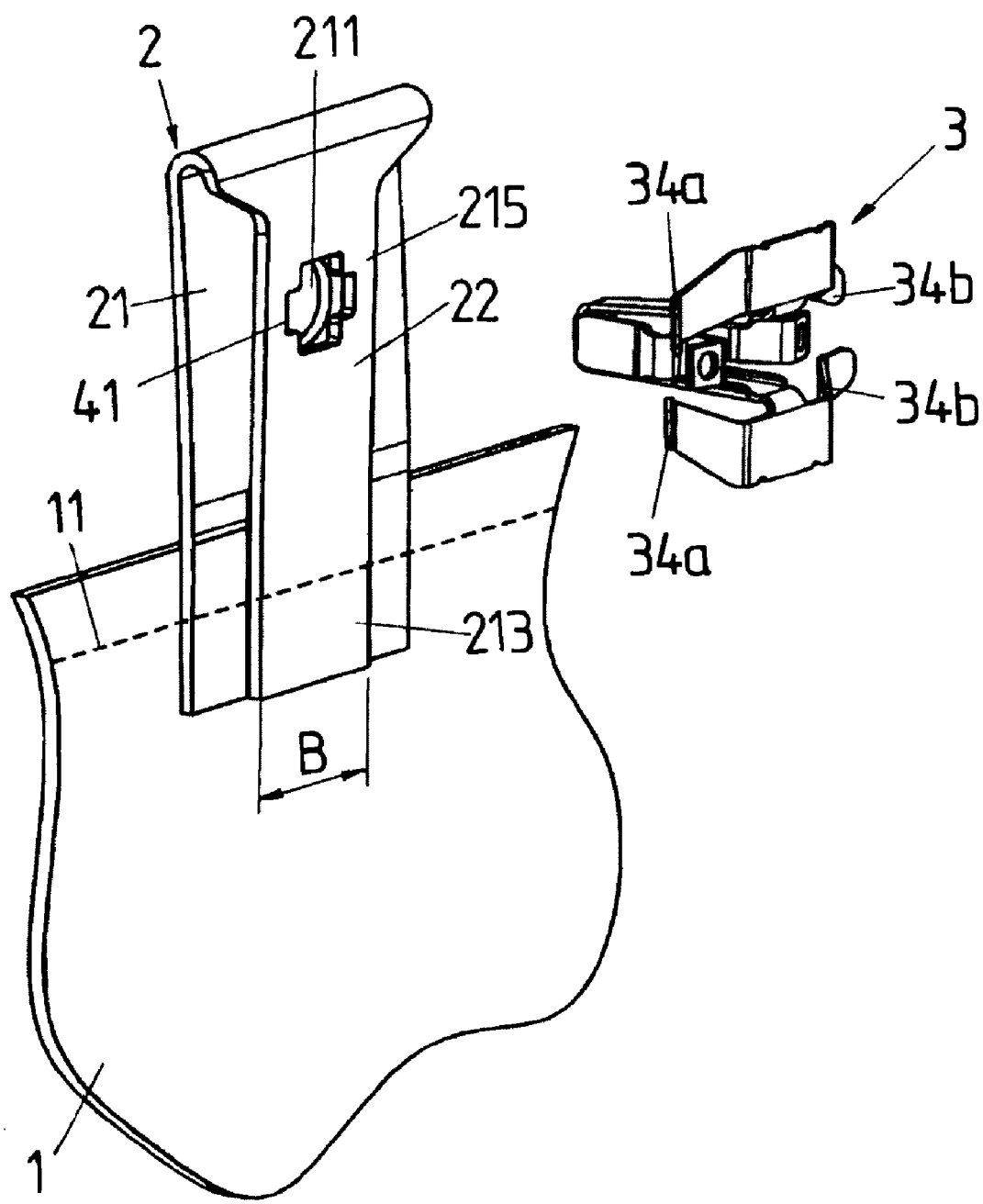
FIG. 6 shows an airbag arrangement according to a third embodiment of the invention.

An area 215 of the second section 21 (in the height of the opening 41) has a smaller width than an end section 213 of the second section 22 which is arranged to the airbag 1. The width B of the section 215 is in particular selected such that the contact surfaces 34a, 34b of the fastening element 3 do not rest on the second section 22 of the fastening strap 2, but rather only on the first section 21, which is to face the holding structure. A modification of the FIG. 5 is shown in FIG. 6, whereupon the width B of the second section 22 of the fastening strap 2 is almost constant over the complete length of the second section 22, that means the second section 22 has in the area of the opening 41 the same width as the end section 213 via which the fastening strap 2 is arranged on the airbag 1.

Figure 7:
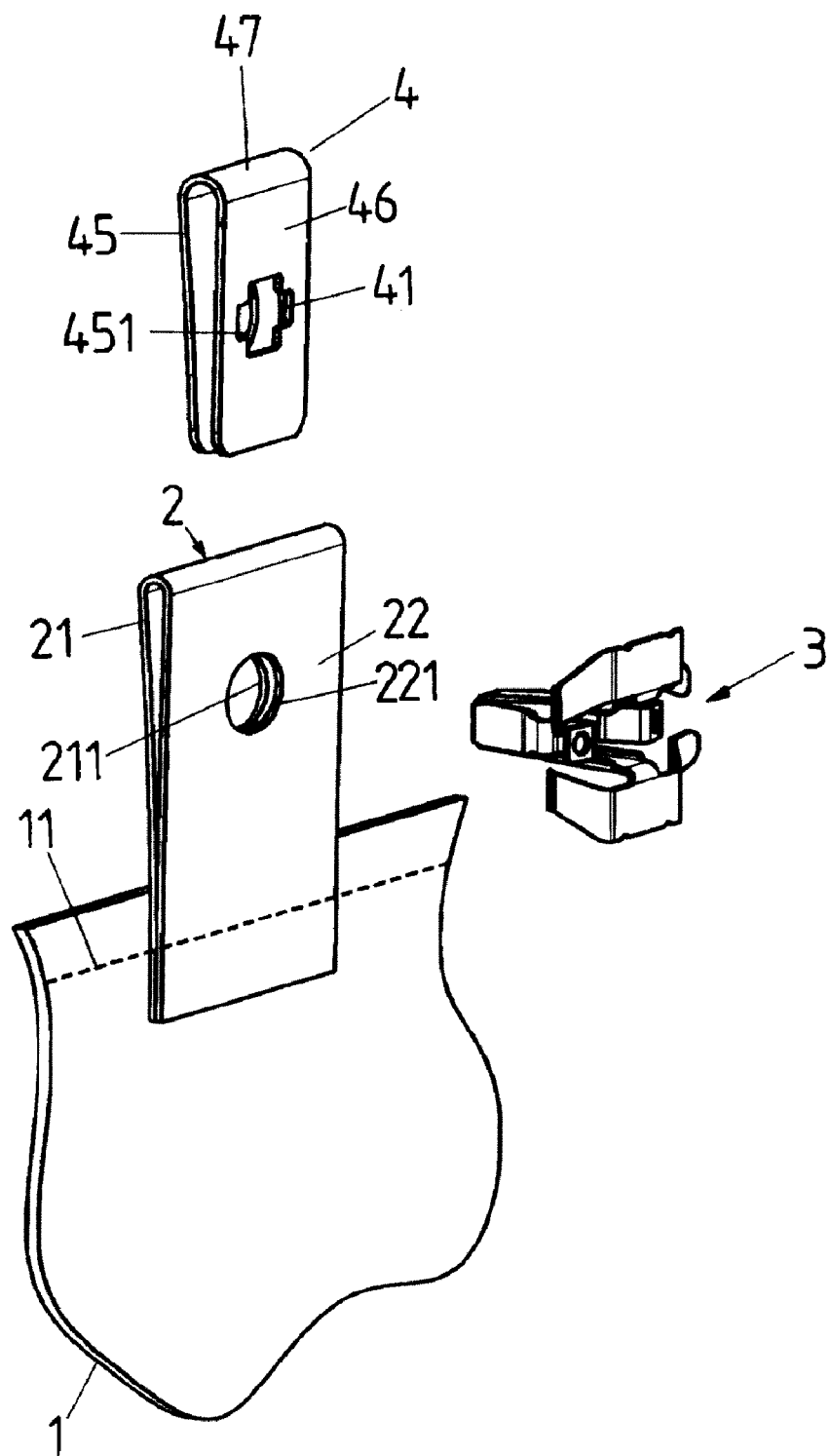
FIG. 7 shows a perspective illustration of components of an airbag arrangement according to a fourth embodiment of the invention.
Figure 8:
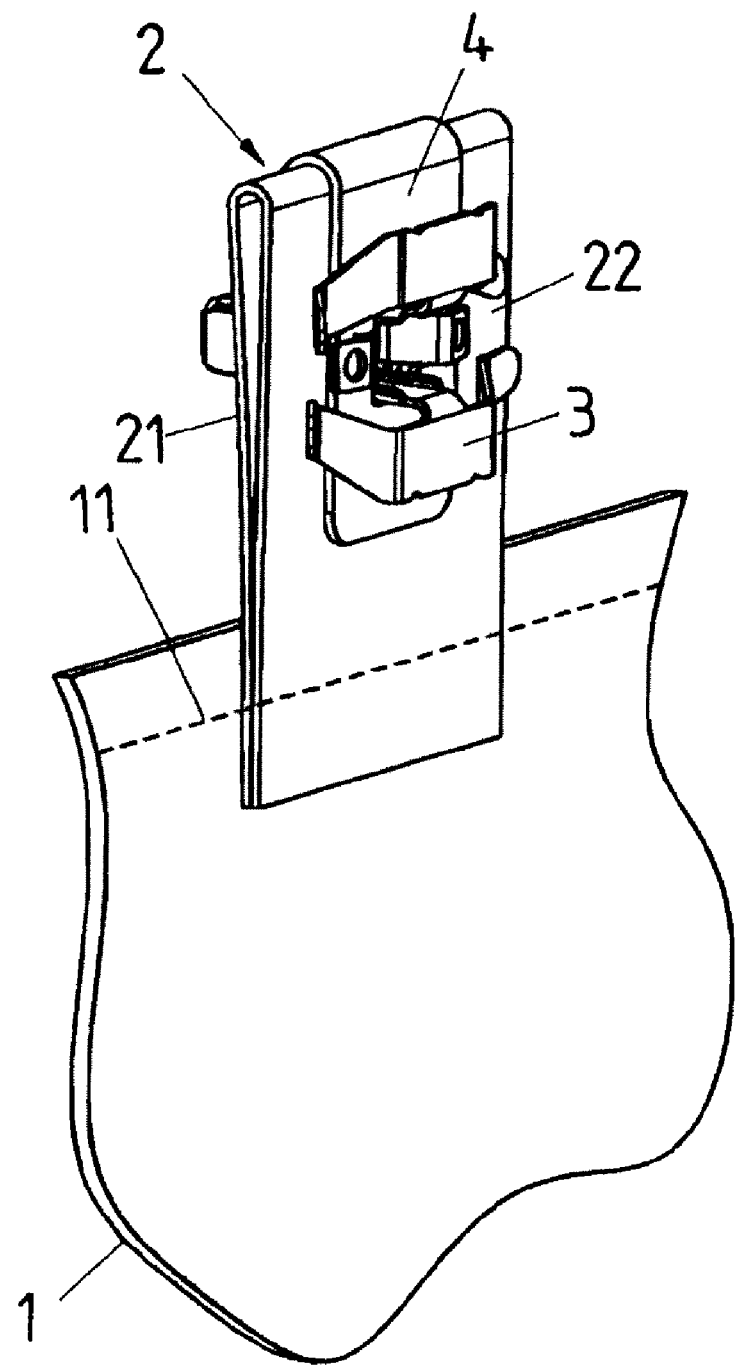
FIG. 8 shows the airbag arrangement of FIG. 7 in the assembled status.

The FIGS. 7 and 8 relate to a further variant of an airbag arrangement according to the invention. Similar to the FIGS. 1 to 4 a part 4 being different from the fastening strap 2 is present, which comprises an opening 41, which is formed such that said opening serves as torquing protection for the fastening element 3. The opening 41 is in particular formed cross-like in analogy to the FIGS. 1 to 6.

However, different to the FIGS. 1 to 4 the separate part 4 is formed clamp-like so that it can be clamped to the fastening strap 2 in a detachable manner. This means that part 4 is not connected to the fastening strap in a lasting manner, but rather is being attached to the fastening strap whereby after attaching the part 4 the opening 41 in the part 4 and the openings 211, 221 in the fastening strap 2 align with each other.

The part 4 is in particular formed in one piece which comprises a first section 45 and a second section 46 which is bent in direction of the first section 45 such that the sections 45, 46 are connected with each other via a bend 47. The part 4 is made such (for instance due to the fact that it is made of a suitable material like metal or plastic) that by bending the sections 45, 46 towards each other a clamp is formed, which creates by bending away from each other (that means exerting a force F) a restoring force such that the part 4 can be clamped on the fastening strap 2.

The first section 45 has an opening 451 which aligns with the opening 41 for torquing protection and can have a similar or identical shape. It is however also possible that the opening 451 is designed differently in the section 45, for instance circular.

In this embodiment the two openings 211, 21 in the fastening strap 2 form a first opening and the openings 451 and 42 in the part 4 form a second opening. After clamping the part 4 on the fastening strap the first and the second opening are aligned with each other.

FIG. 8 shows the components of FIG. 7 in assembled status.

The invention claimed is:
1. An airbag arrangement for a vehicle occupant restraint system comprising:
an inflatable airbag for protecting a vehicle occupant,
a fastening element for fastening the airbag to a support structure, and
means for counteracting a torquing of the fastening element pre-mounted at the airbag,
wherein the means comprise an opening through which the pre-mounted fastening element reaches and which is designed to counteract the torquing of the pre-mounted fastening element, and
wherein the opening is a cross-shaped opening.
2. The airbag arrangement according to claim 1, wherein the fastening element comprises two arms being opposed to each other via which said fastening element is lockable on the support structure wherein the opening comprises two sections of the opening that partially overlay each other, and wherein one of the two sections of the opening is designed such that the arms of the fastening element can reach through said one of the two sections without being pressed together.
3. The airbag arrangement according to claim 1, wherein the opening comprises two sections that partially overlay each other, and wherein the two sections are formed longitudinally so as to form the cross-shape.

4. The airbag arrangement according to claim 1, wherein the opening is formed in a part different from a fastening strap via which the airbag is mountable to the structure, and wherein the part is connected to the fastening strap.

5. The airbag arrangement according to claim 4, wherein the part is arranged with one side of the fastening strap facing away from the support structure in an assembled status of the airbag.

6. The airbag arrangement according to claim 1, wherein the cross-shaped opening is formed in a fastening strap via which the airbag can be mounted to the support structure.

7. The airbag arrangement according to claim 6, wherein the fastening strap has a first section and a second section, which is folded in direction of the first section, and the opening is formed in one of the first and second sections.

8. The airbag arrangement according to claim 7, wherein the second section of the fastening strap has the cross-shaped opening designed to act counteract the torquing of the pre-mounted fastening element, and
wherein the first section comprises an additional opening, which aligns with the cross-shaped opening in the second section.

9. The airbag arrangement according to claim 7, wherein the second section of the fastening strap faces away from the support structure in an assembled status of the airbag.

10. The airbag arrangement according to claim 9, wherein the fastening element in the assembled status rests against a side of the fastening strap with a sub-section, which faces away from the support structure, and
wherein the second section of the fastening strap is designed such that the sub-section of the fastening element rests only against the first section of the fastening strap.

11. The airbag arrangement according to claim 10, wherein the sub-section resting against the fastening strap is formed by two contact surfaces of the fastening element being distanced from each other, and a width of the second section of the fastening strap in an area of the opening is smaller than a distance of the two contact surfaces in the assembled status of the fastening element.

12. A vehicle with an airbag arrangement according to claim 1.

13. An airbag arrangement for a vehicle occupant restraint system comprising:
an inflatable airbag configured to protect a vehicle occupant,
a fastening element configured to fasten the airbag to a support structure, and
a part configured to counteract a torquing of the fastening element pre-mounted at the airbag,
wherein the part includes an opening through which the pre-mounted fastening element reaches and which is designed to counteract the torquing of the pre-mounted fastening element, and
wherein the opening is a cross-shaped opening having two sections that partially overlaying each other.

14. The airbag arrangement according to claim 1, wherein the fastening element comprises two arms being opposed to each other via which said fastening element is lockable on the support structure, and wherein one of the two sections of the opening is designed such that the arms of the fastening element can reach through said one of the two sections without being pressed together.

15. The airbag arrangement according to claim 1, wherein the part with the opening is formed as a part different from a fastening strap via which the airbag is mountable to the support structure.

16. The airbag arrangement according to claim 15, wherein the part is arranged with one side of the fastening strap facing away from the support structure in an assembled status of the airbag.

* * * * *